Sept. 20, 1938.   K. KLEMSCHOFSKI ET AL   2,130,498
POROUS PIPE
Filed May 8, 1937
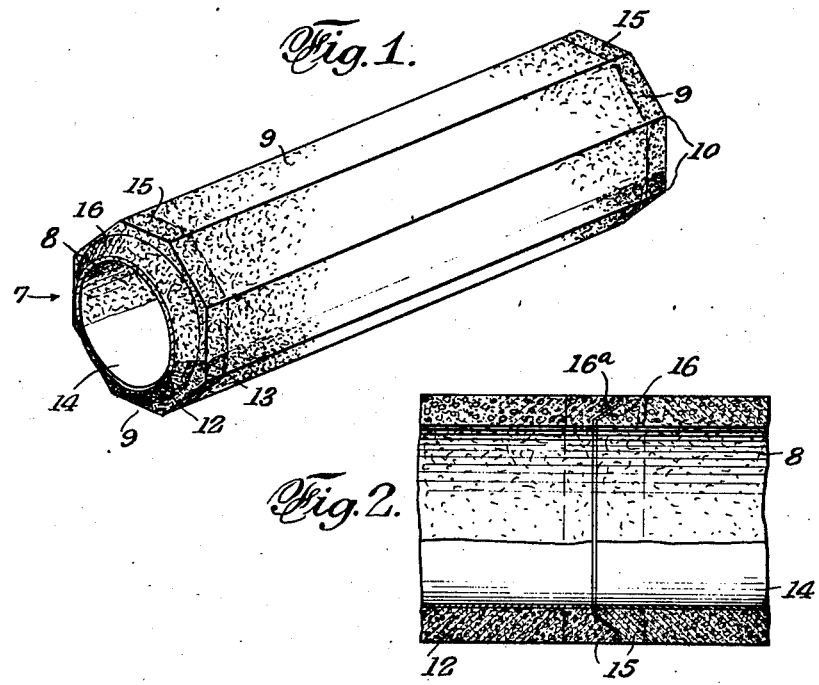
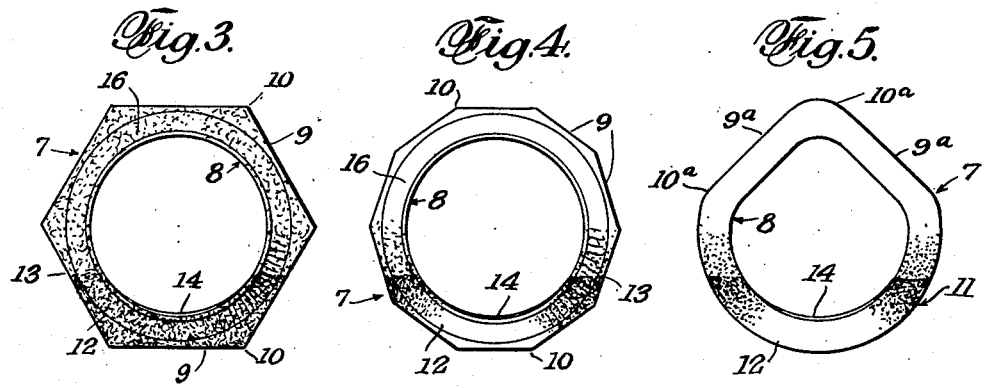
KARL KLEMSCHOFSKI
PAUL VRANE
   INVENTORS
BY *Philip S. McBean*
   ATTORNEY Patented Sept. 20, 1938

2,130,498

UNITED STATES PATENT OFFICE 2,130,498

POROUS PIPE

Karl Klemschofski, Little Ferry, and Paul Vrane, West New York, N. J.

Application May 8, 1937, Serial No. 141,518

4 Claims. (Cl. 61—10)

The invention disclosed herein relates to the manufacture of porous concrete pipe, such as used for surface drainage, and like purposes.

Pipe of such nature, to be sufficiently porous, has heretofore been relatively weak structurally and has required great care in manufacturing and handling. Because of such facts and also because of the special materials employed, such pipe has been more expensive than its uses warranted.

The objects of the present invention are to provide a fully porous pipe of ample strength and which can be commercially produced at relatively low cost.

Additional objects and the various novel features of the invention will appear and are set forth in the following specification.

The drawing accompanying and forming part of the specification illustrates a number of embodiments of the invention and it is contemplated that there may be further modifications and changes all within the true spirit and broad scope of the invention.

Fig. 1 is a perspective view of a hollow drainage tile conforming to and embodying the invention.

Fig. 2 is an enlarged broken longitudinal sectional view illustrating a joint between lengths of the pipe.

Figs. 3, 4 and 5 are end elevations illustrative of different embodiments of the invention.

The desirable qualities of porosity, lightness, strength, low cost and ease of manufacture are attained in this invention by a combination of the composition and the physical form of the pipe.

In composition, it is at present preferred to use an aggregate composed of crushed blast furnace slag and crushed quartz pebbles in substantially equal parts. The furnace slag part may consist of substantially equal parts of so-called three-eighth inch and "screenings". This aggregate of crushed slag and gravel may be combined in a 4 to 1 ratio with cement.

Preferably the aggregates are thoroughly wetted before the cement is added and the cement is mixed in dry, so as to form a binder coating about the separate particles.

By thoroughly soaking, the porous aggregate becomes filled with water which keeps the cement from entering the pores and in effect, confines the cement to the surface, where it will act solely as a binder between adjacent particles.

If during the mixing it appears that the mixture is not just right for a good binder, such additional water or cement as may be required, may be added, but this does not impair the effect of keeping the pores free of binder, if the aggregates have first been fully wetted.

The material mixed as described is molded in pipe form, usually in vertically placed molds, in which the material is brought to the required degree of firmness by tapping or hammering upward on a sheet supporting a core in the center of the mold and while an end die comes down and holds the top of the mold solid, following down sufficiently to tamp and firm the material to a desired extent.

After removal from the mold, the pipe is cured, preferably by heating in a dry kiln containing perforated pipes from which water is sprayed from time-to-time over the contents of the kiln. This method of curing is faster and produces better results than the usual water curing and dry steam curing methods heretofore employed. During this spray curing step, the water soaked up by and filling the pores in the porous portion of the aggregate is vaporized, and expanding, forces its way out through the walls of the pipe, forming and clearing permanent passages through the pipe wall. This also aids in keeping the cement strictly as a binder connecting contacting portions of the aggregate particles.

At the ends of the pipe sections, a special joint mixture may be used to finish the ends off smoothly, prevent sticking to the mold and to prevent expansion and contraction cracks.

This joint mixture in a present preferred embodiment is composed of blast furnace slag screening and dust in a 2 to 1 cement mixture with a small amount of mineral oil, such as a heavy fuel oil. Only a relatively small amount of this joint mixture will ordinarily be used at each end of the pipe, say half an inch or so, just sufficient to prevent sticking to the mold, to provide desirably smooth ends and to impart a certain flexibility or resiliency to prevent cracking.

In molding the pipe, a small amount of the joint mixture may be placed in the bottom of the mold before the main body is poured in and then after the latter is in place, the upper end of the mold will be filled with a similar amount of joint mixture before the mold top comes down.

When mold separator strips are employed for casting pipes with sections of different porosity, the strips which separate the mold cavity in different sections are withdrawn before the tamping or hammering operations, so that the separately molded portions will properly weld together.

Structurally, the pipe is preferably made angular in cross-section, either externally, internally, or both, as distinct and different from the conventional cylindrical forms of molded porous concrete pipe.

In Fig. 1, the pipe 7 is shown as having a generally cylindrical interior 8, and an octagonal exterior providing the effect of substantially flat panels 9, and reinforcement ribs 10.

Fig. 3 shows a pipe of generally hexagonal form and Fig. 4 one of decagonal form.

Fig. 5 illustrates a combination of angular and part cylindrical shape, both interior and exterior. In this particular construction, the upper half of the pipe is made up of angularly related side walls 9a, forming the effect of a peaked roof, connected with and merging into a generally cylindrical lower portion 11.

The effect of the reinforcement ribs or ridges 10, is to brace and strengthen the pipe, so that the panels 9, 9a, between these reinforcements may be materially thinner and hence that much more pervious to flow of liquid. Actually for the same strength, the pipe may be lighter in weight than cylindrical pipe of corresponding wall thickness. The angularly related side walls or panels also enables a definite anchorage in a definite position in the soil. This is particularly important where different portions of the pipe may be of different porosity, for example, as shown where the lower or bottom section of the piping is of denser and less porous nature at 12, than the upper portion above the dividing line 13.

This anchorage against turning also is a desirable feature where the lower portion of the pipe may be lined as with a smooth cement surface 14, where quick run-off of collected liquid may be desirable.

The smoother, joint mixture end portions of the pipe are indicated in a general way at 15, and these may vary in extent to constitute the entire jointed end portions, or merely the contacting parts of the pipe sections.

The form of joint between the pipe sections may vary, but the present preferred construction is a bevelled form of joint provided by the bevelled portions 16, of one pipe end entering the bevelled socket 16a, of an opposing pipe end. These mating bevelled sections in the octagonal, hexagonal and other regular forms of pipe preferably are substantially cylindrical as indicated. In irregular constructions, the bevelled seats and projections may follow the general outline of the pipe substantially as shown in Fig. 5. Various other forms of reinforcement ribs and intervening panels may be provided for the purposes of strengthening the pipe and for improving or increasing liquid flow through the pipe wall. In some instances, the panels between ridges may be more or less concave to act as collectors, for liquid. The reinforcement afforded by the ribbed construction gives the pipe sufficient strength for the molds to be wholly removed without waiting for the pipe to dry.

For larger size pipe or when special additional strength is required, suitable steel reinforcement may be embedded in the molding operation and in such case, rusting is prevented or reduced because of the chemically inert character of the aggregate. A special porous aggregate known as "Pottsco" composed of crushed blast furnace slag, or clinker, of an entirely inert character, may be used where steel reinforcement is employed, or in fact, may be used in all instances.

The invention has many uses. In addition to the usual surface drainage purposes, the pipe may be used for sub-soil irrigation and for the steam fertilization of seed beds, the prevention of fungus growth during winter months, etc. Single lengths of the pipe may be set on end in the ground to form ornamental flower pots or be grouped for example about a flower bed for holding a row of potted plants, the porosity of the pipe in such cases serving desirable irrigation and drainage purposes. The angular sides of the pipe in such instances, may be abutted to form an ornamental wall and if the pipe used is of the type having portions of different density, the pipe may be turned to locate these portions, so as to keep out or admit moisture at the sides desired.

What is claimed is:

1. Porous pipe composed of substantially equal parts of crushed furnace slag and crushed water soaked gravel mixed with dry cement in proportions of approximately a 4 to 1 ratio of aggregates to cement.

2. Porous pipe composed of crushed water soaked blast furnace slag mixed with only sufficient cement to coat the water filled particles and bind them together at their contacting points or edges.

3. Porous pipe composed of porous particles bound together by thin coatings of cement and with the mixture at the ends of the pipe containing small proportions of mineral oil.

4. Porous pipe having end sections composed of blast furnace slag screening in approximately a 2 to 1 cement mixture with a small amount of mineral oil.

KARL KLEMSCHOFSKI.
PAUL VRANE.